US008282851B2

(12) United States Patent
Duwenhorst et al.

(10) Patent No.: US 8,282,851 B2
(45) Date of Patent: Oct. 9, 2012

(54) ANISOTROPIC CELLULAR ELASTOMERS

(75) Inventors: Joern Duwenhorst, Lemfoerde (DE);
Maximilian Ruellmann, Heppenheim (DE); Frank Prissok, Lemfoerde (DE); Sven Lasai, Stemshorn (DE); Steffen Mayer, Lembruch (DE); Michael Harms, Diepholz (DE); Claus Gabriel, Griesheim (DE)

(73) Assignee: BASF SE, Ludwigshafen (DE)

( * ) Notice: Subject to any disclaimer, the term of this patent is extended or adjusted under 35 U.S.C. 154(b) by 557 days.

(21) Appl. No.: 12/518,917

(22) PCT Filed: Dec. 11, 2007

(86) PCT No.: PCT/EP2007/063731
§ 371 (c)(1),
(2), (4) Date: Jun. 12, 2009

(87) PCT Pub. No.: WO2008/074701
PCT Pub. Date: Jun. 26, 2008

(65) Prior Publication Data
US 2010/0038579 A1 Feb. 18, 2010

(30) Foreign Application Priority Data
Dec. 20, 2006 (EP) .................................... 06126683

(51) Int. Cl.
*H01F 1/26* (2006.01)
*F16F 9/53* (2006.01)
*C08G 18/48* (2006.01)
*C08G 18/76* (2006.01)
*C08J 9/228* (2006.01)

(52) U.S. Cl. .................... 252/62.54; 252/62.53; 521/99; 521/155; 521/60; 521/58; 524/431; 524/435; 524/440

(58) Field of Classification Search ............... 252/62.54, 252/62.53; 521/99, 155, 60, 58; 524/431, 524/435, 440
See application file for complete search history.

(56) References Cited

U.S. PATENT DOCUMENTS

| 3,238,355 | A | * | 3/1966 | Van Eeck | 219/528 |
| 4,546,120 | A | * | 10/1985 | Peerman et al. | 521/159 |
| 4,769,166 | A | * | 9/1988 | Harrison | 252/62.54 |
| 4,838,347 | A | * | 6/1989 | Dentini et al. | 165/185 |
| 6,476,113 | B1 | | 11/2002 | Hiles | |
| 7,815,998 | B2 | * | 10/2010 | Simpson et al. | 428/317.9 |
| 2005/0116194 | A1 | | 6/2005 | Fuchs et al. | |

FOREIGN PATENT DOCUMENTS

| DE | 195 48 770 | | 6/1997 |
| DE | 195 48 771 | | 6/1997 |
| DE | 10 2004 041649 | | 3/2006 |
| DE | 102004041649 | * | 3/2006 |
| DE | 10 2005 008 263 | | 8/2006 |
| DE | 10 2005 059 710 | | 6/2007 |
| EP | 0 036 994 | | 10/1981 |
| EP | 0 062 835 | | 10/1982 |
| EP | 0 250 969 | | 1/1988 |
| EP | 0 784 163 | | 7/1997 |
| EP | 1 171 515 | | 1/2002 |
| WO | 2006 007882 | | 1/2006 |
| WO | 2006 066763 | | 6/2006 |

OTHER PUBLICATIONS

Translation for DE 102004041649, dated Mar. 2, 2004.*
Shen, Y. et al., "Experimental Research and Modeling of Magnetorheological Elastomers", Journal of Intelligent Material Systems and Structures, vol. 15, pp. 27-35 (Jan. 2004).
Ginder, J. M. et al., "Magnetorheological Elastomers: Properties and Applications", Part of the SPIE Conference on Smart Materials Technologes, vol. 3675, pp. 131-138 (Mar. 1999).
Davis, L. C. et al., "Model of Magnetorheological Elastomers", Journal of Applied Physics, vol. 85, No. 6, pp. 3348-3351, (Mar. 15, 1999).
Jolly, M. R. et al., "The Magnetoviscoelastic Response of Elastomer Composites Consisting of Ferrous Particles Embedded in a Polymer Matrix", Journal of Intelligent Material Systems and Structures, vol. 7, pp. 613-622 (Nov. 1996).

* cited by examiner

*Primary Examiner* — Carol M Koslow
(74) *Attorney, Agent, or Firm* — Oblon, Spivak, McClelland, Maier & Neustadt, L.L.P.

(57) ABSTRACT

The invention relates to a cellular elastomer which is anisotropic, with anisotropy being defined by the compressive modulus in one of three orthogonal directions being greater than that in the other two directions by a factor of at least 1.5. The invention also relates to a cellular elastomer containing magnetizable particles which have a chain-like alignment along one spatial direction. The invention also relates to a process for producing a cellular elastomer containing magnetiable particles and the use of such elastomers in articles of manufacture.

12 Claims, No Drawings

ANISOTROPIC CELLULAR ELASTOMERS

CROSS-REFERENCE TO RELATED APPLICATIONS

This application is a National Stage of PCT/EP07/063731 filed Dec. 11, 2007. This application claims the benefit of priority from European Patent Application No. 06126683.9 filed Dec. 20, 2006.

BACKGROUND OF THE INVENTION

The present invention relates to cellular elastomers which are preferably anisotropic without an external influence, in particular even without the action of a man-made magnetic field, with the anisotropy being defined by the compressive modulus, preferably measured by a method based on DIN ISO 7743, in one of 3 orthogonal directions being greater than that in the other two directions by a factor of at least 1.5, preferably a factor of from 2 to 50. The invention further relates to cellular elastomers comprising magnetizable particles which have a chain-like alignment preferably parallel to one another along one spatial direction. In addition, the invention relates to a process for producing cellular elastomers, preferably cellular polyurethane elastomers, particularly preferably cellular polyurethane elastomers having a density in accordance with DIN EN ISO 845 in the range from 200 kg/m$^3$ to 5000 kg/m$^3$, with the density being based on the total weight of the cellular polyurethane elastomer, i.e. including the weight of the magnetizable particles, wherein the cellular elastomers are produced in the presence of magnetizable particles so that these magnetizable particles are present in the cellular elastomer and the production of the cellular elastomers is carried out in the presence of a preferably man-made magnetic field which has a flux density of greater than 0.01 tesla, preferably a flux density in the range from 0.05 to 2 tesla. In addition, the present invention relates to cellular elastomers obtainable in this way, in particular motor vehicle helper springs, motor vehicle shock absorber bearings, motor vehicle chassis bearings comprising the cellular elastomers of the invention.

Cellular, for example microcellular, polyisocyanate polyaddition products, usually polyurethanes and/or polyisocyanurates which may if appropriate comprise urea structures and are obtainable by reaction of isocyanates with compounds which are reactive toward isocyanates, and processes for producing them are generally known.

A particular embodiment of these products is cellular, in particular microcellular, polyurethane elastomers which differ from conventional polyurethane foams in their significantly higher density of usually from 200 to 700 kg/m$^3$, preferably from 300 to 700 kg/m$^3$, their particular physical properties and the possible applications resulting therefrom. Such polyurethane elastomers are employed, for example, as vibration-absorbing and shock-absorbing elements, in particular in automobile construction. In automobiles, the spring elements produced from polyurethane elastomers are, for example, pushed onto the piston rod of the shock absorber in the overall shock-absorbing strut unit consisting of shock absorber, spiral spring and the elastomeric spring.

Cellular polyurethane elastomers can be produced only up to a particular material hardness since the material hardness is set only via the density. However, high hardnesses are absolutely necessary in wheel-conducting elastomer applications (bearings) in the area of suspension/chassis. A solution which allows an increase in hardness in one force direction (transverse to the vehicle) but leaves the other directions unchanged (soft) is therefore sought.

High hardnesses also have the disadvantage that hollow cylindrical helper springs based on polyurethane elastomers can no longer be removed from the mold over the core. A higher hardness, preferably only in the direction of force, would represent a solution here.

It was thus an object of the invention to develop cellular polyisocyanate polyaddition products, preferably cellular polyurethane elastomers, which solve the abovementioned problems and, in particular for wheel-conducting applications in a motor vehicle chassis, combine the advantages of a high material hardness and density with the advantages of the known polyurethane elastomers and their manufacturing techniques.

These objects were able to be achieved by the anisotropic cellular elastomers presented at the outset.

DETAILED DESCRIPTION OF THE INVENTION

The compressive modulus of the anisotropic cellular elastomers of the invention is preferably determined by a method based on DIN ISO 7743, particularly preferably with the following modifications:

The test specimens are adhesively bonded to the platens of the testing machine according to method B of DIN ISO 7743.

The compressive properties are determined at a test speed of 30 mm/min instead of 10 mm/min.

The test specimens are in the form of disks having a diameter of 9.0 mm and a thickness of 4.0 mm, instead of a diameter of 29 mm and a height of 12.5 mm.

The compressive modulus is determined from the force-deformation curve at a given deformation of 4% instead of the 10% or 20% specified in DIN ISO 7743. The maximum deformation is 7% instead of 25%.

In the case of the moldings of the invention, hard cellular polyurethane elastomer helper springs which have a high hardness (great stiffness) in the direction of force but can nevertheless be removed from the mold over the core can be produced.

In addition, it is possible to produce shock absorber bearings which have a significant spread of the characteristic lines in the radial direction (hard perpendicular to the direction of travel in order to optimize handling and soft parallel to the direction of travel in order to reduce road noise) according to the invention. This spread of characteristic lines is important, inter alia, when the shock absorber and thus also the shock absorber bearing play a critical part in conducting the wheels (e.g. in the case of McPherson front axles).

In addition, the present invention makes it possible to open up further applications of cellular elastomers in the area of the chassis, since the abovementioned spread of characteristic lines in transverse/parallel directions is generally also necessary here.

The cellular elastomers of the invention are thus preferably used as damping and bearing elements in vehicle construction, for example in automobile construction, e.g. as helper springs, impact buffers, shock-absorbing strut support bearings (in particular for McPherson axles), shock absorber bearings, auxiliary frame bearings, transverse and parallel steering bearings.

Possible cellular elastomers are generally known elastomers which can be produced in the presence of magnetizable particles. As stated at the outset, polyurethane elastomers are preferred. Such elastomers without the aligned magnetizable particles are generally known and have been described widely. The elastomers are preferably microcellular elastomers based on polyisocyanate polyaddition products, preferably ones having cells having a diameter of from 0.01 mm to 1 mm, particularly preferably from 0.01 to 0.25 mm. Elastomers based on polyisocyanate polyaddition products and their production are generally known and have been described widely, for example in EP-B 117 15 15, EP-A 62 835, EP-A 36 994, EP-A 250 969, DE-A 195 48 770 and DE-A 195 48 771.

The anisotropic properties according to the invention of the cellular elastomers are preferably produced by the cellular elastomer comprising magnetizable particles, preferably magnetizable particles having ferromagnetic or ferrimagnetic properties, particularly preferably soft magnetic ferromagnetics or ferrimagnetics.

The isotropic incorporation of magnetizable particles into cellular elastomers is known from WO 2006/007882. The isotropic or anisotropic incorporation of magnetizable particles into compact elastomers is known from U.S. Pat. No. 6,476,113 B1, US 2005/0116194 A1 or WO 2006/024457 A1. As materials for the magnetizable particles of the present invention, it is possible to use the materials described in the abovementioned documents. These are preferably iron, cobalt, nickel (also in impure form) and alloys thereof, e.g. iron-cobalt, iron-nickel, magnetic steel, iron-silicon and/or mixtures thereof, also oxidic ceramic materials such as cubic ferrites, perovskites and garnets of the general formula $MO.Fe_2O_3$ comprising one or more metals from the group consisting of Mn, Fe, Co, Ni, Cu, Zn, Ti, Cd and magnesium and mixtures thereof. Mixtures such as MnZn, NiZn, NiCo, NiCuCo, NiMg, CuMg ferrites and/or mixtures thereof and also particles of iron carbide, iron nitride, alloys of vanadium, tungsten, copper and manganese and/or mixtures thereof are also suitable. A further particularly useful material is magnetite ($Fe_3O_4$).

Preference is given to using iron powder, preferably finely divided iron powder, particularly preferably carbonyl iron powder which has preferably been prepared from iron pentacarbonyl, gas- and/or water-atomized iron powder, coated iron powder and mixtures of the abovementioned magnetizable particles as magnetizable particles. The magnetizable particles can preferably have a mean longest dimension of from 0.01 to 1000 μm.

The shape of the magnetizable particles can be uniform or irregular. For example, the particles can be spherical, rod-like or acicular. The spherical shape, i.e. the ball shape or a shape similar to the ball shape, is preferred particularly when high degrees of fill are sought.

When spherical particles are used, the mean diameter [$d_{50}$] is preferably from 0.01 to 1000 μm, particularly preferably from 0.1 to 100 μm, in particular from 0.5 to 10 μm. The abovementioned orders of magnitude for the mean diameter are particularly advantageous for production of the anisotropic cellular elastomers of the invention because they lead to better redispersibility and a better flowability of the PU components laden with the particles.

When spherical particles are not used, the mean longest dimension of the magnetizable particles used according to the invention is preferably from 0.01 to 1000 μm, preferably from 0.1 to 500 μm. When metal powder is used as magnetizable particles, this can be obtained, for example, by reduction of corresponding metal oxides. The reduction may, if appropriate, be followed by a sieving or milling process. Further ways of producing suitable metal powder is electrolytic deposition or the production of metal powder by means of water atomization or gas atomization. It is also possible to use mixtures of magnetizable particles. In particular, the size distribution of the magnetizable particles used can also be bimodal.

As indicated at the outset, the present invention further provides cellular elastomers comprising magnetizable particles which have a chain-like alignment preferably parallel to one another along one spatial direction. The magnetizable particles are preferably arranged in a chain-like fashion, with the chains being arranged parallel to one another. The chains preferably run linearly, i.e. parallel to a spatial direction, or in an arc, for example in a U-shape, particularly preferably linearly. The magnetizable particles in the elastomer can have locally different degrees of alignment. The local alignment in the elastomer can be determined at a fixed degree of fill by means of, for example, the ratio of the mean particle spacing perpendicular to the chains to the mean particle spacing along the chains. The larger this ratio at a given degree of fill by magnetizable particles, the more pronounced the local alignment. The chain-like arrangements of the magnetizable particles can go right through the entire molding of the cellular elastomer but can also be shorter. Shorter chains can result, for example, from interruptions due to the cellular structure.

The magnetizable particles in the cellular polyurethane elastomer preferably have a chain-like alignment along one spatial direction and are accordingly anisotropically aligned. This chain-like alignment is the result of the action of a magnetic field on the magnetizable particles during the production of the cellular elastomer and the fixing of this alignment by the curing of the cellular elastomer. The expression chain-like alignment means that the magnetizable particles are present next to one another. The rows of magnetizable particles next to one another (chains) run through the material along one spatial direction, namely along the spatial direction in which the material has the greater elastic modulus. Preference is given to a plurality of parallel rows of magnetizable particles being present. The mean spacing of the rows becomes smaller as the degree of fill by magnetizable particles increases.

The cellular elastomer preferably comprises from 1 to 95% by weight, preferably from 10 to 75% by weight, of magnetizable particles, based on the total weight of the cellular elastomer comprising the magnetizable particles.

In the process of the invention for producing anisotropic cellular elastomers, preferably cellular polyurethane elastomers, having a density in accordance with DIN EN ISO 845 in the range from 300 kg/m$^3$ to 5000 kg/m$^3$, with the density being based on the total weight of the cellular polyurethane elastomer, i.e. including the weight of the magnetizable or magnetic particles, the cellular elastomers are produced in the presence of magnetizable particles so that these magnetizable particles are present in the cellular elastomer and the production of the cellular elastomers is carried out in the presence of a magnetic field which has a flux density of greater than 0.01 tesla, preferably a flux density of from 0.1 to 2 tesla.

Production is preferably carried out in a mold. Cellular polyurethane elastomers are particularly preferably produced in a mold by reaction of (a) isocyanates with (b) compounds which are reactive toward isocyanates, with magnetizable particles being comprised in at least one of the starting components, i.e. (a) and/or (b). It can also be preferred to use prepolymers having isocyanate groups as isocyanates.

Here, the volume of the mold is filled by a magnetic field whose field lines run along the spatial direction in which the cellular elastomer is to have a greater elastic modulus. The magnetic field can be produced by means of permanent magnets or electromagnets. The production of compact elastomers in the presence of a magnetic field is described in Ginder et al., Magnetorheological Elastomers: Properties and Applications, SPIE vol. 3675, pp 131, WO 2006/024457 and in US 2005/0116194 A1.

If the magnetic field is produced by means of permanent magnets, preference is given to arranging two permanent magnets in such a way that the north pole of the one magnet and the south pole of the other magnet face the interior of the mold. The magnets are preferably located in the walls of the mold or else outside the walls of the mold. Possible materials for the permanent magnets are all ferromagnetic or ferrimagnetic substances, preferably ferromagnetic metals, particularly preferably neodymium-iron-boron compounds which allow a particularly high permanent magnetization. Such magnets can be obtained, for example, from the internet supply company supermagnete.de. The permanent magnets are either present in the walls of the mold or outside the walls of the mold before filling of the mold or they are brought into their positions only after filling of the mold but before solidification has progressed to a significant degree.

When electromagnets are used, an electric conductor is usually wound around a yoke made of ferromagnetic or ferrimagnetic material, preferably soft magnetic iron. The yoke serves to increase the magnetic flux density and to conduct the magnetic field. The pole pieces of the yoke are let into the walls of the mold or are located outside the mold and the mold is in between in the space filled with the magnetic field. The magnetic field produced by the electromagnet is switched on either before filling of the mold or preferably after the mold is filled but before solidification has progressed to a significant degree.

A further possible way of producing the magnetic field is to use a combination of permanent magnets and electromagnets. The field of the permanent magnets can be compensated by an electromagnet in order to achieve a field-free state, e.g. during filling of the mold, and, moreover, the field of the permanent magnets can be reinforced by the electromagnet in order to achieve the required magnetic flux densities, particularly in the case of large cross sections of the cellular elastomer in the direction of the magnetic field lines.

A specific embodiment of the combination of mold/magnet comprises a magnet structure (electromagnet or permanent magnet or a combination of the two) in the region of a mold charging facility (e.g. mixing head) and a sequential charging line or a carousel of molds which can be exposed to the magnetic field one after the other.

The design of the permanent magnets or the electromagnets can preferably be matched to the desired geometry of the cellular elastomer and the desired mechanical properties.

The magnetic field is preferably maintained at least until the elastomer has cured to a sufficient extent and the arrangement of the magnetizable particles has been fixed.

As material of the mold, it is possible to choose a nonmagnetic material such as aluminum so as not to disturb the magnetic field produced by the permanent magnets and/or electromagnets; alternatively, a magnetic material can be deliberately used in at least some regions in order to influence the magnetic field produced by the permanent magnets and/or electromagnets in an optimal way.

As indicated at the outset, methods of producing cellular polyurethane elastomers are generally known. Production of the cellular polyurethane elastomers can preferably be carried out in a two-stage process, particularly preferably by preparing a prepolymer having isocyanate groups by reaction of (a) isocyanate with (b) compounds which are reactive toward isocyanates and, if appropriate, chain extenders and/or crosslinkers (c) in the first stage and reacting this prepolymer with a crosslinker component comprising (d) water and, if appropriate, (e) catalysts, (f) blowing agents and/or (g) auxiliaries in a mold in the second stage to give a cellular polyurethane elastomer, with magnetizable particles being comprised in the prepolymer and/or the crosslinker component, preferably the prepolymer.

The production of the preferred polyurethane elastomers is described by way of example below.

They are usually produced by reaction of isocyanates with compounds which are reactive toward isocyanates. The elastomers based on cellular polyisocyanate polyaddition products are usually produced in a mold in which the reactive starting components are reacted with one another. Molds which are suitable here are ones which, due to their shape, ensure the three-dimensional shape according to the invention of the spring element. In choosing the mold material, the interaction with the magnetic field can preferably be taken into account, as indicated above.

The process of the invention for producing the cellular elastomers can preferably be carried out by using the following starting materials:

(a) isocyanate,
(b) compound which is reactive toward isocyanates,
(d) water;
and, if appropriate,
(e) catalysts,
(f) blowing agents and/or
(g) auxiliaries, in a single-stage or two-stage process, with the magnetizable particles used according to the invention being added to one or more of the components mentioned.

When the cellular polyurethane elastomer is produced in a two-stage process in which a prepolymer having isocyanate groups is prepared in the first stage, the magnetizable particles mentioned at the outset are preferably added to the prepolymer and preferably very homogeneously dispersed therein by stirring, shaking or other mixing methods. The prepolymer with the magnetizable particles is then reacted with the crosslinker component in a second stage to give a cellular polyurethane elastomer.

When the cellular polyurethane elastomer is not produced in a two-stage process, the magnetizable particles mentioned at the outset are preferably added to the component (b) or parts of the component (b), with preference being given to components (d), (e), (f) and (g) already being comprised in the component (b). The magnetizable particles are preferably very homogeneously dispersed in the component (b) by stirring, shaking or other mixing methods. Component (a), if appropriate also already comprising components (f) and (g), is then mixed in.

The production of the cellular polyisocyanate polyaddition products of the invention is preferably carried out in a mold having a surface temperature of the interior wall of the mold of from 50 to 100° C., preferably from 75 to 90° C. For the present purposes, the "surface temperature of the interior wall of the mold" is the temperature which the surface of the interior wall of the mold, i.e. the surface of the mold which is usually in contact with the reaction system in the production of the moldings has at least briefly, preferably for at least 10 minutes, during production of the moldings.

The production of the moldings is preferably carried out at an NCO/OH ratio of from 0.85 to 1.20, with the heated starting components being mixed and introduced in an amount corresponding to the desired density of the molding into a heated, preferably tightly closing mold.

The moldings are usually cured and thus able to be removed from the mold after from 5 to 40 minutes.

The amount of reaction mixture introduced into the mold is usually calculated so that the moldings obtained have the density indicated above. The cellular polyisocyanate polyaddition products which can be obtained according to the invention preferably have a density in accordance with DIN 53420 of from 200 to 5000 kg/m³, particularly preferably from 300 to 2000 kg/m³, with the density being based on the total weight of the cellular polyurethane elastomer, i.e. including the weight of the magnetizable or magnetic particles.

The starting components usually have a temperature of from 15 to 120° C., preferably from 30 to 110° C., when introduced into the mold. The degrees of compaction for producing the moldings are in the range from 1.1 to 8, preferably from 2 to 6.

The cellular polyisocyanate polyaddition products of the invention are advantageously produced by the "one-shot" process with the aid of the low-pressure technique or in a high-pressure process or in particular by the known reaction injection molding technique (RIM) in open or preferably closed molds. The reaction is, in particular, carried out with compaction in a closed mold.

When a mixing chamber having a number of inflow nozzles is used, the starting components can be fed in individually and be intensively mixed in the mixing chamber. It has been found to be advantageous to employ the two-component process.

In a particularly advantageous embodiment, an NCO-comprising prepolymer is prepared first in a two-stage process. For this purpose, the component (b) and, if appropriate, chain extenders (c), e.g. butanediol, is/are reacted with an excess of (a) at temperatures of usually from 80° C. to 160° C., preferably from 110° C. to 150° C. The reaction time is chosen so as to reach the theoretical NCO content. The prepolymer comprising isocyanate groups preferably has an NCO content of from 1% by weight to 30% by weight, preferably from 2% by weight to 14% by weight and in particular from 3% by weight to 10% by weight.

The auxiliaries and/or additives (g) can preferably be comprised in the crosslinker component. As auxiliaries and additives (g) in the crosslinker component, preference is given to using at least one generally known carbodiimide as hydrolysis inhibitor, for example 2, 2',6,6'-tetraisopropyldiphenylcarbodiimide, foam stabilizers such as silicone oils or surface-active substances for improving the homogeneity of the reaction mixture.

To improve demolding of the moldings produced according to the invention, it has been found to be advantageous to coat the interior surfaces of the mold with customary external mold release agents, for example ones based on wax or silicone, or in particular aqueous soap solutions, at least at the beginning of a production series.

The demolding times depend on the size and geometry of the molding and are on average from 5 to 40 minutes.

After production of the moldings in the mold, the moldings can preferably be heated at temperatures of usually from 70 to 140° C. for a period of from 1 to 48 hours.

As regards the further starting components, the following may be said:
as isocyanates (a), it is possible to use generally known (cyclo)aliphatic and/or aromatic polyisocyanates. Particularly suitable polyisocyanates for producing the composite elements according to the invention are aromatic diisocyanates, preferably diphenylmethane 2,2'-, 2,4'- and/or 4,4'-diisocyanate (MDI), naphthylene 1,5-diisocyanate (NDI), toluoylene 2,4- and/or 2,6-diisocyanate (TDI), 3,3'-dimethylbiphenyl diisocyanate (tolidine diisocyanate (TODI)), 1,2-diphenylethane diisocyanate, p-phenylene diisocyanate and/or (cyclo)aliphatic isocyanates such as hexamethylene 1,6-diisocyanate, 1-isocyanato-3,3,5-trimethyl-5-isocyanatomethylcyclohexane and/or polyisocyanates such as polyphenylpolymethylene polyisocyanates. The isocyanates can be used in the form of the pure compound, in mixtures and/or in modified form, for example in the form of uret diones, isocyanurates, allophanates or biuretes, preferably in the form of reaction products comprising urethane and isocyanate groups, known as isocyanate prepolymers. Preference is given to using optionally modified diphenylmethane 2,2'-, 2,4'- and/or 4,4'-diisocyanate (MDI), naphthylene 1,5-diisocyanate (NDI), toluoylene 2,4- and/or 2,6-diisocyanate (TDI), tolidine diisocyanate (TODI), and/or mixtures of these isocyanates.

As compounds (b) which are reactive toward isocyanates, it is possible to use generally known polyhydroxyl compounds, preferably ones having a functionality toward isocyanate groups of from 2 to 3 and preferably a molecular weight of from 60 to 6000, particularly preferably from 500 to 6000, in particular from 800 to 3500. Preference is given to using generally known polyether polyols, polyester polyols, polyether ester polyols and/or hydroxyl-comprising polycarbonates as (b). Particular preference is given to using polyester polyols, polytetrahydrofuran (PTHF) and polypropylene glycol (PPG).

Suitable polyester polyols can, for example, be prepared from dicarboxylic acids having from 2 to 12 carbon atoms and dihydric alcohols. Examples of possible dicarboxylic acids are: adipic acid, phthalic acid, maleic acid. Examples of dihydric alcohols are glycols having from 2 to 16 carbon atoms, preferably from 2 to 6 carbon atoms, e.g. ethylene glycol, diethylene glycol, 1,4-butanediol, 1,5-pentanediol, 1,6-hexanediol, 1,10-decanediol, 1,3-propanediol and dipropylene glycol. Depending on the desired properties, the dihydric alcohols can be used either alone or, if appropriate, in mixtures with one another. As polyester polyols, preference is given to using ethanediol polyadipates, 1,4-butanediol polyadipates, ethanediol-butanediol polyadipates, 1,6-hexanediol-neopentyl glycol polyadipates, 1,6-hexanediol-1,4-butanediol polyadipates and/or polycaprolactones.

Suitable polyoxyalkylene glycols, essentially polyoxytetramethylene glycols, comprising ester groups are polycondensates of organic, preferably aliphatic dicarboxylic acids, in particular adipic acid, with polyoxymethylene glycols having a number average molecular weight of from 162 to 600 and, if appropriate, aliphatic diols, in particular 1,4-butanediol. Further suitable polyoxytetramethylene glycols comprising ester groups are polycondensates derived from polycondensation with ε-caprolactone. Suitable polyoxyalkylene glycols, essentially polyoxytetramethylene glycols, comprising carbonate groups are polycondensates of these with alkyl or aryl carbonates or phosgene.

Information on the component (b) is provided by way of example in DE-A 195 48 771, page 6, lines 26 to 59.

In addition to the above-described components which are reactive toward isocyanates, it is additionally possible to use chain extenders and/or crosslinkers (c) having a molecular weight of less than 500, preferably from 60 to 499, for example compounds selected from the group consisting of bifunctional and/or trifunctional alcohols, bifunctional to tetrafunctional polyoxyalkylene polyols and alkyl-substituted aromatic diamines or mixtures of at least two of the chain extenders and/or crosslinkers mentioned. As (c), it is possible to use, for example, alkanediols having from 2 to 12, preferably 2, 4 or 6, carbon atoms, e.g. ethanediol, 1,3-propanediol, 1,5-pentanediol, 1,6-hexanediol, 1,7-heptanediol, 1,8-octanediol, 1,9-nonanediol, 1,10-decanediol and preferably 1,4-butanediol, dialkylene glycols having from 4 to 8 carbon atoms, e.g. diethylene glycol and dipropyleneglycol, and/or bifunctional to tetrafunctional polyoxyalkylene polyols. However, it is also possible to use branched-chain and/or unsaturated alkanediols having usually not more than 12 carbon atoms, e.g. 1,2-propanediol, 2-methyl-, 2,2-dimethyl-1, 3-propanediol, 2-butyl-2-ethyl-1,3-propanediol, 2-butene-1, 4-diol and 2-butyne-1,4-diol, diesters of terephthalic acid with glycols having from 2 to 4 carbon atoms, e.g. bis(ethylene glycol) or bis(1,4-butanediol) terephthalate, hydroxyalkylene ethers of hydroquinone or resorcinol, e.g. 1,4-di-(b-hydroxyethyl)hydroquinone or 1,3-di(b-hydroxyethyl) resorcinol, alkanolamines having from 2 to 12 carbon atoms, e.g. ethanolamine, 2-aminopropanol and 3-amino-2,2-dimethylpropanol, N-alkyl-dialkanolamines, such as N-methyldiethanolamine and N-ethyldiethanolamine. Examples of higher-functional crosslinkers (c) are trifunctional and higher-functional alcohols such as glycerol, trimethylolpropane, pentaerythritol and trihydroxycyclohexanes and also trialkanolamines such as triethanolamine.

Chain extenders which have been found to be very useful and are therefore preferably used are alkyl-substituted aromatic polyamines which have molecular weights of preferably from 122 to 400, in particular primary aromatic diamines which have at least one alkyl substituent which reduces the reactivity of the amino group by stearic hindrance in the ortho position relative to the amino groups and are liquid at room temperature and at least partly but preferably completely immiscible with the relatively high molecular weight, preferably at least bifunctional compounds (b) under the process conditions. To produce the moldings according to the invention, it is possible to use the industrially readily available 1,3,5-triethyl-2,4-phenylenediamine, 1-methyl-3,5-diethyl-2,4-phenylenediamine, mixtures of 1-methyl-3,5-diethyl-2, 4- and -2,6-phenylenediamines, known as DETDA, isomer mixtures of 3,3'-dialkyl- or 3,3',5,5'-tetraalkyl-substituted 4,4'-diaminodiphenylmethanes having from 1 to 4 carbon atoms in the alkyl radical, in particular 3,3',5,5'-tetraalkyl-substituted 4,4'-diaminodiphenylmethanes comprising bound methyl, ethyl and isopropyl radicals and also mixtures of the abovementioned tetraalkyl-substituted 4,4'-diaminodiphenylmethanes and DETDA.

To achieve specific mechanical properties, it can also be advantageous to use the alkyl-substituted aromatic polyamines in admixture with the abovementioned low molecular weight polyhydric alcohols, preferably dihydric and/or trihydric alcohols or dialkylene glycols.

The production of the cellular polyisocyanate polyaddition products is preferably carried out in the presence of water (d). The water acts both as crosslinker to form urea groups and also, owing to the reaction with isocyanate groups to form carbon dioxide, as blowing agent. Owing to this dual function, it is listed separately from (c) and (f) in the present text. Thus, the components (c) and (f) by definition do not contain any water which by definition is listed exclusively as (d). The amounts of water which can advantageously be used are from 0.01 to 5% by weight, preferably from 0.3 to 3.0% by weight, based on the weight of the component (b), determined before addition of magnetizable particles.

To accelerate the reaction, generally known catalysts (e) can be added to the reaction mixture both during the preparation of a prepolymer and, if appropriate, during the reaction of a prepolymer with a crosslinker component. The catalysts (e) can be added either individually or in admixture with one another. They are preferably organic metal compounds such as tin(II) salts of organic carboxylic acids, e.g. tin(II) dioctoate, tin(II) dilaurate, dibutyltin diacetate and dibutyltin dilaurate and tertiary amines such as tetramethylethylenediamine, N-methylmorpholine, diethylbenzylamine, triethylamine, dimethylcyclohexylamine, diazabicyclooctane, N,N'-dimethylpiperazine, N-methyl,N'-(4-N-dimethylamino)butylpiperazine, N,N,N',N'',N''-pentamethyldiethylenediamine or the like. Further possible catalysts are: amidines such as 2,3-dimethyl-3,4,5,6-tetrahydropyrimidine, tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali metal alkoxides such as sodium methoxide and potassium isopropoxide and also alkali metal salts of long-chain fatty acids having from 10 to 20 carbon atoms and, if appropriate, lateral OH groups. Depending on the reactivity to be set, the catalysts (e) are employed in amounts of from 0.001 to 0.5% by weight, based on the weight of the prepolymer before addition of the magnetizable particles.

If appropriate, customary blowing agents (f) can be used in the production of the polyurethanes. Examples of suitable blowing agents are low-boiling liquids which vaporize under the action of the exothermic polyaddition reaction. Suitable blowing agents are liquids which are inert toward the organic polyisocyanate and have boiling points below 100° C. Examples of such liquids which are preferably used are halogenated, preferably fluorinated, hydrocarbons, e.g. methylene chloride and dichloromonofluoromethane, perfluorinated or partially fluorinated hydrocarbons, e.g. trifluoromethane, difluoromethane, difluoroethane, tetrafluoroethane and heptafluoropropane, hydrocarbons such as n-butane and isobutane, n-pentane and isopentane and also the industrial mixtures of these hydrocarbons, propane, propylene, hexane, heptane, cyclobutane, cyclopentane and cyclohexane, dialkyl ethers such as dimethyl ether, diethyl ether and furan, carboxylic esters such as methyl and ethyl formate, ketones such as acetone and/or fluorinated and/or perfluorinated tertiary alkylamines, e.g. perfluorodimethyliso-propylamine. Mixtures of these low-boiling liquids with one another and/or with other substituted or unsubstituted hydrocarbons can also be used. The most advantageous amount of low-boiling liquid for producing such cell-comprising elastic moldings of elastomers comprising bound urea groups depends on the density which is to be achieved and on the amount of the water which is preferably concomitantly used. In general, amounts of from 1 to 15% by weight, preferably from 2 to 11% by weight, based on the weight of the component (b), determined before addition of magnetizable particles, give satisfactory results. Particular preference is given to using exclusively water (d) as blowing agent.

Auxiliaries (g) can be used in the production of the moldings. These include, for example, generally known surface-active substances, foam stabilizers, cell regulators, fillers, flame retardants, nucleating agents, oxidation inhibitors, stabilizers, lubricants and mold release agents, dyes and pigments.

Possible surface-active substances are, for example, compounds which serve to aid the homogenization of the starting materials and may also be suitable for regulating the cell structure. Mention may be made, for example, of emulsifiers such as the sodium salts of castor oil sulfates or fatty acids and also salts of fatty acids with amines, e.g. diethylamine oleate, diethanolamine stearate, diethanolamine ricinolate, salts of sulfonic acids, e.g. alkali metal or ammonium salts of dodecylbenzenedisulfonic or dinaphthylmethanedisulfonic acid and ricinolic acid; foam stabilizers such as siloxane-oxyalkylene copolymers and other organosiloxanes, ethoxylated alkylphenols, ethoxylated fatty alcohols, paraffin oils, castor oil esters or ricinolic esters, Turkey red oil and peanut oil and cell regulators such as paraffins, fatty alcohols and dimethylpolysiloxanes. Furthermore, oligomeric polyacrylates having polyoxyalkylene and fluoroalkane radicals as side groups are suitable for improving the emulsifying action, the cell structure and/or their stabilization. The surface-active substances are usually employed in amounts of from 0.01 to 5 parts by weight, based on 100 parts by weight of the relatively high molecular weight polyhydroxyl compounds (b) (without taking added magnetizable particles into account).

For the purposes of the present invention, fillers, in particular reinforcing fillers, are the customary organic and inorganic fillers, reinforcing materials and weighting agents known per se. Specific examples are: inorganic fillers such as siliceous minerals, for example sheet silicates such as antigorite, serpentine, hornblendes, amphiboles, chrysotile, talc; metal oxides such as kaolin, aluminum oxides, aluminum silicate, titanium oxides and iron oxides, metal salts such as chalk, barite and inorganic pigments such as cadmium sulfide, zinc sulfide and also glass particles. Examples of organic fillers are: carbon black, melamine, expanded graphite, rosin, cyclopentadienyl resins and graft polymers. As reinforcing fillers, preference is given to using fibers, for example carbon fibers or glass fibers, particularly when a high heat distortion resistance or very high stiffness is required, with the fibers being able to have been coated with bonding agents and/or sizes. The inorganic and organic fillers can be used individually or as mixtures and are usually incorporated into the reaction mixture in amounts of from 0.5 to 50% by weight, preferably from 1 to 30% by weight, based on the weight of the formative components (a) to (c), with the weight of any added magnetizable particles not being taken into account.

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl) ethylenediphosphate. Apart from the abovementioned halogen-substituted phosphates, it is also possible to use inorganic flame retardants such as red phosphorus, hydrated aluminum oxide, antimony trioxide, arsenic trioxide, ammonium polyphosphate and calcium sulfate or cyanuric acid derivatives such as melamine or mixtures of at least two flame retardants, e.g. ammonium phosphates and melamine and also, if appropriate, starch and/or expanded graphite, for making the cellular PU elastomers produced according to the invention flame resistant. In general, it has been found to be advantageous to use from 5 to 50 parts by weight, preferably from 5 to 25 parts by weight, of the flame retardants or flame retardant mixtures mentioned per 100 parts by weight of the formative components (a) to (c), with the weight of any added magnetizable particles not being taken into account.

As nucleating agents, it is possible to use, for example, talc, calcium fluoride, sodium phenylphosphinate, aluminum oxide and finely divided polytetrafluoroethylene in amounts of up to 5% by weight, based on the total weight of the formative components (a) to (c), with the weight of any added magnetizable particles not being taken into account. Suitable oxidation inhibitors and heat stabilizers which can be added to the cellular PU elastomers of the invention are, for example, halides of metals of group I of the Periodic Table, e.g. sodium, potassium, lithium halides, if appropriate in combination with copper (I) halides, e.g. chlorides, bromides or iodides, stearically hindered phenols, hydroquinones and also substituted compounds of these groups and mixtures thereof which are preferably used in concentrations up to 1% by weight based on the weight of the formative components (a) to (c). Examples of hydrolysis inhibitors are various substituted carbodiimides such as 2,2',6,6'-tetraisopropyldiphenylcarbodiimide which are generally used in amounts of up to 2.0% by weight, based on the weight of the formative components (a) to (c), with the weight of any added magnetizable particles not being taken into account. Lubricants and mold release agents, which are likewise usually added in amounts up to 1% by weight, based on the weight of the formative components (a) to (c), with the weight of any added magnetizable particles not being taken into account, are stearic acid, stearyl alcohol, stearic esters and stearylamides and also fatty acid esters of pentaerythritol. It is also possible to add organic dyes such as nigrosine, pigments such as titanium dioxide, cadmium sulfide, cadmium sulfide selenide, phthalocyanines, ultramarine blue or carbon black. It is also possible to add microbicides and/or organic colorants.

Further details regarding the abovementioned other customary auxiliaries and additives may be found in the specialist literature.

The following examples illustrate the invention.

EXAMPLES

Example 1

Microcellular Polyurethane Based on 1,5-NDI a) Preparation of a Prepolymer Having Isocyanate Groups and Based on 1,5-NDI:

1000 parts by weight of a poly(ethanediol (0.5 mol)-1,4-butanediol (0.5 mol) adipate) having an average molecular weight of 2000 (calculated from the experimentally determined hydroxyl number) were heated to 140° C. and admixed and reacted at this temperature with 240 parts by weight of solid NDI with vigorous stirring. This gave a prepolymer having an NCO content of 4.18% and a viscosity at 90° C. of 2600 mPas (measured using a rotational viscometer).

b) Crosslinker Component:
composed of

| | |
|---|---|
| 55.0 parts by weight of | a 50% strength aqueous solution of a fatty acid sulfonate |
| 15.8 parts by weight of | 2,2',6,6'-tetraisopropyldiphenyl-carbodiimide |
| 3.5 parts by weight of | a mixture of fatty acid polyglycol esters and amine salts of alkylbenzenesulfonates |
| 0.4 part by weight of | mixture of 30% by weight of pentamethyldiethyl-enetriamine and 70% by weight of N-methyl-N'-(dimethyl-aminoethyl)-piperazine |

Production of the Cellular Elastomer:

44.17 parts by weight of carbonyl iron powder (total amount of iron in the finished part: 30% by weight) were mixed into 100 parts of the prepolymer (a) which had been preheated to 90° C. and the crosslinker component (b) which had been preheated to 50° C. was subsequently mixed in intimately and briefly (10 sec). The mixing ratio of the prepolymer including carbonyl iron powder with the crosslinker component is 100:2.5 based on the masses weighed in. The amount of the system used was selected so that a density (taking into account the iron) of about 580 kg/m$^3$ was obtained. As carbonyl iron powder, use was made of the grade EQ from BASF Aktiengesellschaft having a mean diameter [$d_{50}$] of from 2.5 to 3.5 μm.

The finished system was poured into a brass ring which stood on the pole piece of an electromagnet. The brass ring makes it possible to produce disk-shaped test specimens having a diameter of 31 mm and a thickness of 10 mm (=internal dimensions of the brass ring). After filling the brass ring, the other pole piece was placed from above on the ring comprising the system and the magnetic field was subsequently established by switching on the coil current. The brass ring and the pole pieces of the magnet were preheated to about 90° C. The PU system was exposed to the magnetic field for about 10 minutes, after which the magnetic field was switched off and the brass ring with the partially cured specimen was taken from the pole pieces and heated at 80° C. in an oven for a further 20 minutes. To complete the reaction, the specimen was heated at 110° C. for a further 14 hours.

The electromagnet comprises a coil having 1350 copper windings which are wound around a soft iron yoke. The yoke has a constant square cross section of 4×4 cm². When the pole pieces of the yoke are, as in the production of the anisotropic cellular elastomers, about 10 mm apart and a current of 3 amperes flows through the coil, a magnetic flux density between the pole pieces of 0.29 tesla (measured with an empty gap) is obtained.

The characterization of the finished specimens by means of a scanning electron microscope clearly shows chain-like structures of the carbonyl iron particles along the spatial direction in which the magnetic field lines were oriented. The compressive modulus of the material produced in this way, determined by a method based on DIN ISO 7743 (the deviations from the method described in the standard have been explained above in the description), along the orientation direction of the iron particles is 18 MPa and that in the two spatial directions perpendicular thereto is 0.7 MPa, i.e. in compression, the anisotropy of the elastic modulus is 18:0.7=25.7.

Further Properties of the Material

The elastomer of Example 1 also displays a clear anisotropy in the elastic modul in tension, i.e. it displays an anisotropy in the tensile modulus. The tensile modulus can be determined by the same method as the compressive modulus, i.e. by the above-described method based on DIN ISO 7743. Adhesive bonding of the test specimens to the platens of the testing machine allows tensile stresses to be applied, too.

The tensile modulus parallel to the orientation direction of the carbonyl iron particles is 10 MPa, and that perpendicular to the orientation direction is 0.7 MPa, i.e. under tensile stress, the anisotropy of the elastic modulus is 10:0.7=14.3 and is thus smaller than under compressive stress.

On cyclic compressive or tensile stressing of the material, a significantly more strongly pronounced hysteresis behavior is observed parallel to the orientation direction of the iron particles than in the perpendicular orientation. At a deformation rate of 30 mm/min and a maximum deformation of 7%, the dissipated energy per unit volume per loading and unloading cycle in parallel orientation is 9400 J/m³ in compression and 3700 J/m³ in tension. In perpendicular orientation, the dissipated energy per unit volume is 175 J/m³ in compression and 190 J/m³ in tension. The test specimens were cylindrical with a height of 4 mm and a diameter of 9 mm.

The material displays magnetorheological properties, i.e. the complex shear modulus, measured in oscillatory shear at frequencies in the range from 0.1 to 10 Hz, increases parallel to the orientation direction of the carbonyl iron particles and the magnetic field vector on application of a magnetic field. The orientation direction of the carbonyl iron particles corresponds to the direction of the shear gradient. The increase in the shear modulus is reversible, i.e. the modulus returns to its initial value on switching off the magnetic field. The size of the relative magnetorheological effect on the storage modulus G' is 8% at a shear frequency of 1 Hz and a shear amplitude of 0.1%. Magnetorheological effects in compact elastomers, known as magnetorheological elastomers, and their measurement are described in, for example, WO 2006/024457 A1.

The material displays a higher specific electrical conductivity parallel to the chain-like structures of the carbonyl iron particles than perpendicular thereto. In addition, as the compressive pressure increases, the specific conductivity is found firstly to increase and then, after going through a maximum, to decrease again. This behavior is observed both in measurements parallel to and perpendicular to the orientation direction of the carbonyl iron particles. The maximum in the pressure-dependent specific conductivity, measured at a potential of U=10 volt, is about $10^{-6}$ S/cm at about 6 bar for parallel orientation and about $2 \cdot 10^{-10}$ S/cm at about 5 bar for perpendicular orientation.

The material displays, in addition to the orientation of the iron particles in chain-like structures, an anisotropy in the cell morphology. The foam cells are also arranged in chain-like structures, i.e. the cell walls which are oriented parallel to the direction of the magnetic field applied during production form approximately continuous walls. The cell walls which are oriented perpendicular to the direction of the magnetic field applied during production instead tend to be arranged randomly. This anisotropy in the cell morphology is attributable to the flow processes during foam formation caused by interaction of the magnetic field and the magnetizable particles.

Comparative examples not according to the invention:

Comparative Example 2 formulation as in example 1 but without addition of carbonyl iron powder and without application of a magnetic field during the polymerization.

Comparative Example 3 formulation as in example 1 but without addition of carbonyl iron powder. A magnetic field was applied as described above.

Comparative Example 4 formulation as in example 1 including carbonyl iron powder but without application of a magnetic field during the polymerization.

The following table shows the mechanical anisotropy in compression of the abovementioned example materials 1 to 4:

|  | 0% by weight of iron | 30% by weight of iron |
| --- | --- | --- |
| B = 0 tesla | Comparative example 2<br>0.6 MPa: 0.6 MPa = 1 | Comparative example 4<br>0.8 MPa: 0.8 MPa = 1 |
| B = 0.29 tesla | Comparative example 3<br>0.6 MPa: 0.6 MPa = 1 | Example 1<br>18 MPa: 0.7 MPa = 25.7 |

Only when magnetizable particles and a magnetic field are used in production of the elastomer is anisotropy in the compressive modulus obtained.

Example 5

Microcellular Polyurethane Based on MDI a) Preparation of a Prepolymer Having Isocyanate Groups and Based on MDI 57.0 parts by weight of polytetrahydrofuran 2000 (PolyTHF® 2000 from BASF Aktiengesellschaft) and 14.3 parts by weight of polytetrahydrofuran 1000 (PolyTHF® 1000 from BASF Aktiengesellschaft) and also 0.2 part by weight of foam stabilizer based on silicone (DC 193 from Dow Corning) were heated to 140° C. under a nitrogen atmosphere in a three-neck flask and admixed with 28.5 parts by weight of 4,4'-diisocyanatodiphenylmethane (Lupranat® MES from BASF Aktiengesellschaft) while stirring. The reaction temperature was maintained at 145° C. for 10 minutes to complete the reaction and to form allophanate and subsequently cooled. This gave a virtually colorless liquid having an NCO content of 5.7%, an allophanate content of 0.2% and a viscosity of 1600 mPas at 80° C.

b) Crosslinker Component:
composed of

| | |
|---|---|
| 74.1 parts by weight of | a 50% strength aqueous solution of a fatty acid sulfate |
| 24.6 parts by weight of | nonionic emulsifier polyethylene glycol (PEG-40) sorbital hexaoleate |
| 0.4 part by weight of | di-n-octyltin bis(2-ethylhexylthioglycolate) |
| 0.9 part by weight of | a mixture of Lupragen ® N 202 (BASF Aktiengesellschaft) and Niax ® catalyst E-A-1 (GE Silicones) catalysts | c) Production of the Cylindrical Molding 44.73 parts by weight of carbonyl iron powder (total amount of iron in the finished part: 30%) were mixed into 100 parts of the prepolymer (a) which had been preheated to 90° C. and the crosslinker component (b) which had been preheated to 35° C. was subsequently mixed in intimately. The mixing ratio of the prepolymer including carbonyl iron powder with the crosslinker component is 100:3.0 based on the masses weighed in. The amount of the system used was selected so that a density of about 560 kg/m³ was obtained (taking into account the iron). As carbonyl iron powder, use was made of the grade EQ from BASF Aktiengesellschaft having a mean diameter [$d_{50}$] of from 2.5 to 3.5 μm.

The mixture was introduced into a closable mold which had been heated to 75° C. The mold makes it possible to produce disk-shaped test specimens having a diameter of 31 mm and a thickness of 10 mm. Cuboidal permanent magnets ("Kollosse" from internet supply company supermagnete.de) are let into the bottom and the lid of the mold. The magnets have a square base of 4×4 cm². The spacing of the magnets is 12 mm when the mold is closed and the resulting magnetic flux density in the space in between is about 0.6 tesla (measured on empty mold). Apart from the magnets, the mold comprises nonmagnetic metals (aluminum and brass). With the mold open, the PU system was poured onto the bottom of the mold behind which one of the magnets is located. The lid of the mold was then shut and the second magnet was thus brought into position and the magnetic field for alignment of the iron particles along the axis of the disk was established.

The mixture was cured in the magnet mold described for 10 minutes. The molding produced in this way was stored in the mold in an oven at 80° C. for 20 minutes to complete the reaction. After removal of the microcellular product from the mold, the molding was thermally after-cured at 110° C. for 14 hours.

The characterization of the finished specimens by means of a scanning electron microscope clearly shows chain-like structures of carbonyl iron particles along the spatial direction in which the magnetic field lines were oriented. The compressive modulus of the material produced in this way, determined by a method based on DIN ISO 7743 (the deviations from the method described in the standard have been explained above in the description), along the orientation direction of the iron particles is 15 MPa and that in the two spatial directions perpendicular thereto is 0.9 MPa, i.e. in compression, the anisotropy of the elastic modulus is 15:0.9=16.7.

Comparative examples not according to the invention:

Comparative Example 6 formulation as in example 5 but without addition of carbonyl iron powder and without application of a magnetic field during the polymerization.

Comparative Example 7 formulation as in example 5 but without addition of carbonyl iron powder. A magnetic field was applied as described above Comparative Example 8 formulation as in example 5 including carbonyl iron powder but without application of a magnetic field during the polymerization.

The following table shows the mechanical anisotropy in compression of the abovementioned example materials 5 to 8:

| | 0% by weight of iron | 29% by weight of iron |
|---|---|---|
| B = 0 tesla | Example 6: 0.8 MPa: 0.8 MPa = 1 | Example 8: 1.0 MPa: 1.0 MPa = 1 |
| B = 0.35 tesla | Example 7: 0.8 MPa: 0.8 MPa = 1 | Example 5: 15 MPa: 0.9 MPa = 16.7 |

Only when magnetizable particles and a magnetic field are used in production of the elastomer is anisotropy in the compressive modulus obtained.

The invention claimed is:

1. A damping or bearing element comprising a cellular elastomer comprising magnetizable particles which have a chain-like alignment along one spatial direction.

2. The damping or bearing element according to claim 1 wherein said cellular elastomer is a cellular polyurethane elastomer.

3. The damping or bearing element according to claim 1 wherein said cellular elastomer is a cellular polyurethane elastomer having a density in accordance with DIN EN ISO 845 in the range from 200 to 5000 kg/m³, wherein the density is based on the total weight of the cellular polyurethane elastomer.

4. The damping or bearing element according to claim 1 comprising iron powder as the magnetizable particles.

5. The damping or bearing element according to claim 1 comprising carbonyl iron powder as the magnetizable particles.

6. The damping or bearing element according to claim 1, wherein the magnetizable particles have a spherical, rod-like or acicular shape.

7. The damping or bearing element according to claim 1, wherein spherical particles having a mean diameter [$d_{50}$] in the range from 0.01 to 1000 μm are present as the magnetizable particles.

8. The damping or bearing element according to claim 1, wherein magnetizable particles having a mean longest dimension in the range from 0.01 to 1000 μm are present as the magnetizable particles.

9. The damping or bearing element according to claim 1, wherein the magnetizable particles have a chain-like alignment along one spatial direction and are accordingly aligned anisotropically.

10. The damping or bearing element according to claim 1 comprising from 1 to 95% by weight of magnetizable particles, based on the total weight of the cellular elastomer comprising the magnetizable particles.

11. The damping or bearing element according to claim 1, wherein said element is at least one of a helper spring, a shock-absorbing strut, a shock absorber bearing or a chassis bearing in a motor vehicle.

12. The damping or bearing element according to claim 1, wherein said cellular elastomer has a density of from 300 to 2,000 kg/m$^3$.

* * * * *